J. EIDA.
COOKING STOVE.
APPLICATION FILED JUNE 12, 1919.
1,399,704. Patented Dec. 6, 1921.
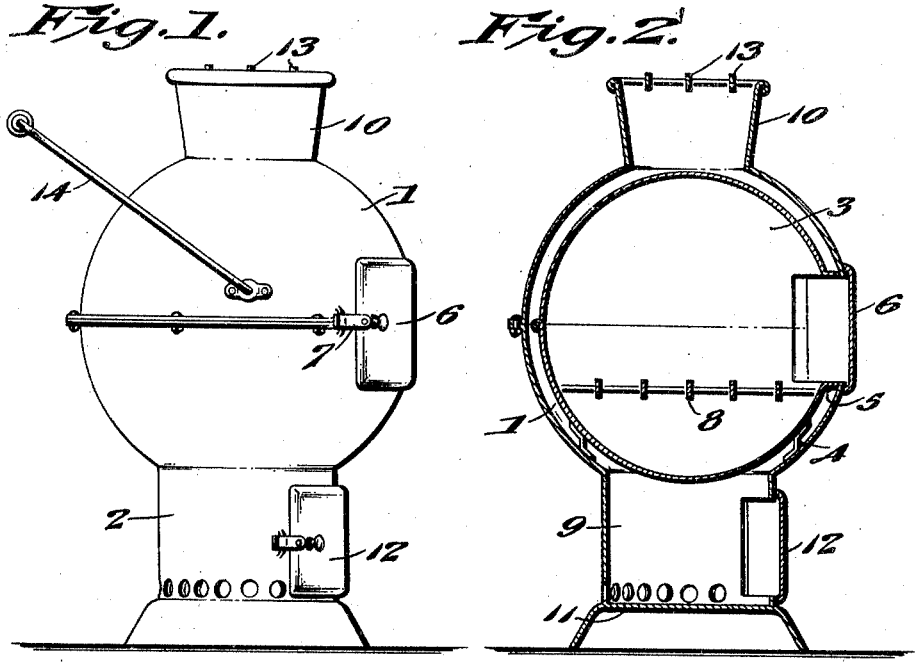
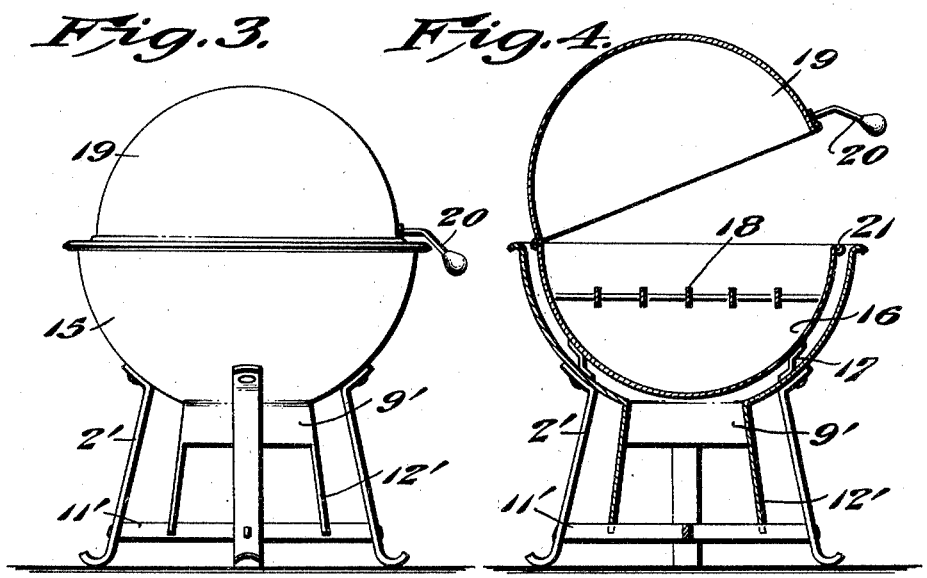
Inventor
Jacob Eida
By Lloyd W. Patch
his Attorney

UNITED STATES PATENT OFFICE.

JACOB EIDA, OF SOUTH BOSTON, MASSACHUSETTS.

COOKING-STOVE.

1,399,704.                Specification of Letters Patent.       Patented Dec. 6, 1921.

Application filed June 12, 1919. Serial No. 303,593.

*To all whom it may concern:*

Be it known that I, JACOB EIDA, a citizen of Russia, residing at South Boston, in the county of Suffolk and State of Massachusetts, have invented new and useful Improvements in Cooking-Stoves, of which the following is a specification.

My present invention relates to cooking stoves, and particularly to devices of this character made to be portable and intended for use primarily for camp or outings, or otherwise where light cooking is to be done.

An object of my invention is to provide a stove structure which lends itself particularly to the use of a liquid burner and of solid or semi-solid fuel in "canned" or "cube" form, the construction being such that the heat is confined and is concentrated about those points at which cooking is to be done.

A further object resides in constructing the stove to have a drum in which foods may be cooked and a grid upon which foods and utensils containing foods or liquids can be placed for heating, the arrangement being such that the heat is conducted around the drum and is directed to said grid.

Another object is to provide suitable support and flue structure to secure proper draft at the heating element and a proper direction of the heat, to arrange for access to said drum, and, generally to construct the parts to be substantial and durable and to give a maximum heating and cooking efficiency for the fuel consumed.

With these and other objects in view, which will be apparent from the specification, drawing, and claims, this invention includes novel features of construction and combinations of parts which will now be set forth.

In the drawing:

Figure 1 is a view in elevation showing one embodiment of my invention.

Fig. 2 is a vertical sectional view through the structure disclosed in Fig. 1.

Fig. 3 is a view in elevation illustrating a modified construction which might be employed.

Fig. 4 is a vertical sectional view through the modified construction.

In the embodiment shown in Figs. 1 and 2, the outer heat retaining casing 1, which is of spherical or drum shape, is supported by a tubular leg 2, and this casing has openings in the top and bottom thereof. A cooking container or drum 3, smaller in all of its dimensions than casing 1 and similarly shaped, is mounted within casing 1 and is held by clips 4 to be spaced from the walls thereof.

Openings are provided through the casing 1 and container 3 at one side and the space between said members is sealed around these openings by a wall 5. The door opening thus formed giving access to the interior of container 3 is closed by a door 6, said door being retained in its closed position by latch 7. A supporting grate 8 is mounted in the container 3 below the door opening and foods to be cooked or warmed are placed thereon.

As has been stated, casing 1 has openings at the top and bottom, and the tubular leg forms a bottom flue at 9 around the bottom opening, a top flue 10 being connected around the top opening. A supporting floor 11 is secured within the tubular leg 2 beneath flue 9 and a door 12 is provided to give access for placing a burner or fuel container, draft openings being formed through the tubular leg above the floor. Grid bars 13 are connected across the top of flue 10 and preferably extend slightly thereabove.

With the arrangement of the parts as described, a liquid burning lamp, a container of semi-solid fuel, or a tray with cubes of solid fuel thereon is placed to be supported on floor 11 beneath flue 9, and when the fuel is ignited a direct draft is created up through flue 9 and out at the top of flue 10. The heat and products of combustion arising through flue 9 strike the bottom of container or drum 3 and are diffused to circulate on all sides of this container, within the confines of casing 1, before passing out at flue 10, and consequently foods placed through the door opening upon supporting grating 8 will be properly heated and cooked. Grid 13 forms a support upon which foods or culinary utensils containing foods or liquids can be placed to be heated, and as the grid bars are raised above the top of flue 10 a proper heat escape and draft is maintained even though a large vessel be set upon the grid. If desired, a handle or bail 14 may be associated with the casing so that the stove can be readily lifted and carried.

In the form of stove illustrated in Figs. 3 and 4, a bowl-shaped casing 15 is employed, which casing is supported in the manner described above and is fitted with a bottom flue as outlined. The container 16 is formed to follow substantially the shape of casing 15 and is secured in spaced relation therefrom by clips 17. The container 16 has a supporting grating 18, and a cover 19 is hinged to the container to close down over the open top thereof, handle 20 being provided for raising and lowering said cover.

In this adaption a plurality of legs 2' are substituted for the tubular leg as described above, and supporting bars 11' are connected across between these legs. A flue 9' is provided around the lower opening of the casing or drum, and extensions 12' support this flue 9' from the bars 11'.

With this form of stove, the heat and products of combustion rising from a burner or heating element carried on the supporting bar is confined by the bottom flue and passing therefrom is diffused to circulate around the container, the heat and products of combustion escaping between container 16 and casing 15. In practice it may be found desirable to somewhat constrict the space between the casing and container, and under such circumstances the edge of the container may be rolled outwardly as at 21.

From the foregoing it will be seen that I have provided a cooking stove structure which adapts itself well to the employment of condensed fuel for heating or cooking foods and liquids, which confines the limited heat to secure the greatest efficiency therefrom, and which from its general all around character and compactness is well suited for use as a portable cooking stove and in other connections where a larger and more cumbersome stove could not be used.

While I have described specific embodiments and have mentioned only certain possible modifications, it will be understood that in practice I do not limit myself to such specific details, but may resort to practical modifications falling within the scope of the invention as defined in the appended claims.

I claim:

1. A cooking stove including with a bowl shaped casing having an opening in the bottom thereof, a supporting leg structure on which said bowl is mounted provided with a support for a heating element, a two-part container mounted in the bowl shaped casing and spaced therefrom, said container being adapted to be opened to give access to the interior, and a flue arranged around the opening of the bowl shaped casing to embrace a heating element supported by the legs and to direct heat therefrom through the opening of the casing to circulate around said container.

2. A cooking stove including with a casing having top and bottom openings, a container mounted within the casing in line with the openings and spaced from the casing, said container being of substantially spherical shape to present a surface offering little resistance to the passage of air through said openings and within the casing, and means to support a heating element beneath the bottom opening of the casing to heat air to circulate within the casing and escape through the top opening.

In testimony whereof, I affix my signature.

JACOB EIDA.